(12) United States Patent
Ribeiro et al.

(10) Patent No.: US 9,622,249 B2
(45) Date of Patent: Apr. 11, 2017

(54) APPARATUS AND METHOD TO SET A CONTROL CHANNEL CONFIGURATION IN A COMMUNICATION SYSTEM

(75) Inventors: Cassio Ribeiro, Espoo (FI); Klaus Doppler, Berkeley, CA (US); Jarkko Kneckt, Espoo (FI)

(73) Assignee: NOKIA TECHNOLOGIES OY, Espoo (FI)

(*) Notice: Subject to any disclaimer, the term of this patent is extended or adjusted under 35 U.S.C. 154(b) by 193 days.

(21) Appl. No.: 13/991,746

(22) PCT Filed: Dec. 20, 2010

(86) PCT No.: PCT/IB2010/055967
§ 371 (c)(1),
(2), (4) Date: Jun. 5, 2013

(87) PCT Pub. No.: WO2012/085620
PCT Pub. Date: Jun. 28, 2012

(65) Prior Publication Data
US 2013/0258989 A1 Oct. 3, 2013

(51) Int. Cl.
*H04W 80/04* (2009.01)
*H04W 88/06* (2009.01)
(Continued)

(52) U.S. Cl.
CPC ......... *H04W 72/082* (2013.01); *H04W 16/14* (2013.01); *H04W 36/06* (2013.01)

(58) Field of Classification Search
CPC ..... H04W 80/04; H04W 88/06; H04W 28/04; H04W 72/04
(Continued)

(56) References Cited

U.S. PATENT DOCUMENTS

| 5,778,318 A * | 7/1998 | Talarmo et al. ............ 455/452.1 |
| 2001/0048691 A1* | 12/2001 | Chang ................. H04W 72/082 370/442 |

(Continued)

FOREIGN PATENT DOCUMENTS

| EP | 2229021 A1 | 9/2010 | |
| KR | WO2011118993 * | 9/2011 | ............. H04B 15/00 |

(Continued)

OTHER PUBLICATIONS

Motorola, Reliable Downlink Control for Heterogeneous Networks, Oct. 12-16, 2009.*

(Continued)

*Primary Examiner* — Ronald B Abelson
(74) *Attorney, Agent, or Firm* — Squire Patton Boggs (US) LLP

(57) ABSTRACT

An apparatus, method and system to set a control channel configuration in a response to an indication of interference in a communication system. In one embodiment, an apparatus includes a processor 520 and memory 550 including computer program code. The memory 550 and the computer program code are configured to, with the processor 520, cause the apparatus to detect interference for the apparatus operable on a communication system from another communication system, and provide an indication of the interference to a base station. The memory 550 and the computer program code are further configured to, with the processor 520, cause the apparatus to receive an indication of a relocation of at least a portion of a control channel to a protected area in response to a signal from the base station.

20 Claims, 12 Drawing Sheets

(51) Int. Cl.
*H04W 28/04* (2009.01)
*H04W 72/04* (2009.01)
*H04W 72/08* (2009.01)
*H04W 16/14* (2009.01)
*H04W 36/06* (2009.01)

(58) Field of Classification Search
USPC .................................................. 370/328, 329
See application file for complete search history.

(56) References Cited

U.S. PATENT DOCUMENTS

| | | | |
|---|---|---|---|
| 2002/0068576 A1* | 6/2002 | Ritzen et al. ................. | 455/450 |
| 2008/0212555 A1* | 9/2008 | Kim .................... | H04J 13/0062 |
| | | | 370/344 |
| 2008/0267131 A1* | 10/2008 | Kangude ........... | H04W 36/0072 |
| | | | 370/331 |
| 2009/0092059 A1 | 4/2009 | Fu | |
| 2009/0197631 A1 | 8/2009 | Palanki et al. | |
| 2009/0233554 A1* | 9/2009 | Cordeiro et al. ............ | 455/63.1 |
| 2010/0118825 A1* | 5/2010 | Kawamura et al. .......... | 370/330 |
| 2012/0034913 A1* | 2/2012 | Wang .................... | H04W 16/14 |
| | | | 455/426.1 |

FOREIGN PATENT DOCUMENTS

| | | |
|---|---|---|
| WO | 03001742 A1 | 1/2003 |
| WO | 2004/004140 A2 | 1/2004 |
| WO | 2008/049966 A1 | 5/2008 |
| WO | 2009/129261 A1 | 10/2009 |
| WO | 2010/006208 A1 | 1/2010 |
| WO | 2010124729 A1 | 11/2010 |

OTHER PUBLICATIONS

International Search Report and Written Opinion received for corresponding Patent Cooperation Treaty Application No. PCT/IB2010/055967, dated Aug. 8, 2011, 12 pages.
European Patent Office, Extended European Search Report corresponding to European Appln. No. 10860939.7, Oct. 17, 2016.

* cited by examiner

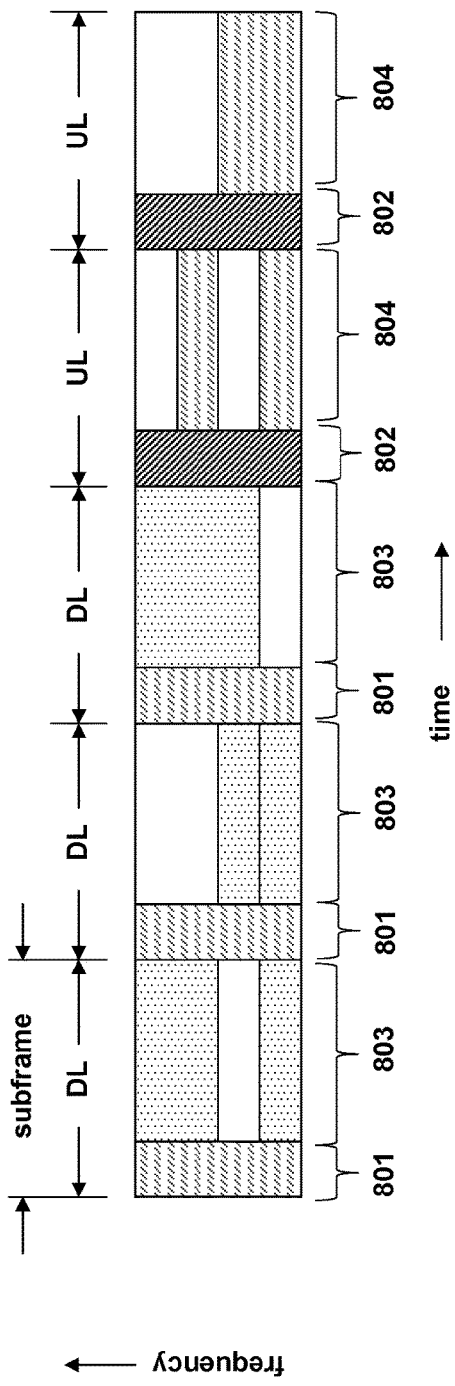
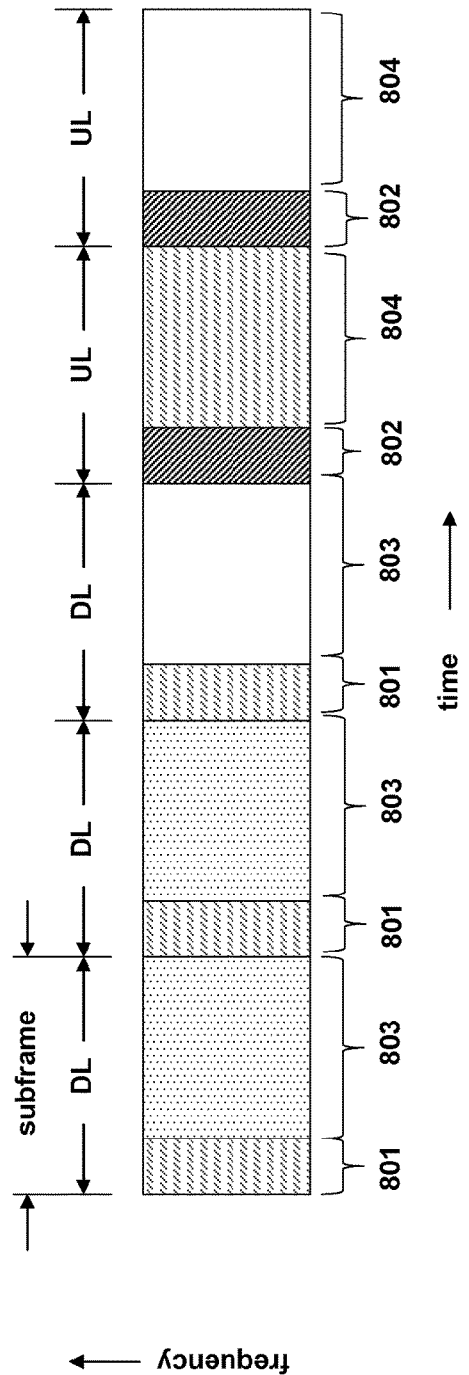
FIGURE 8A
FIGURE 8B

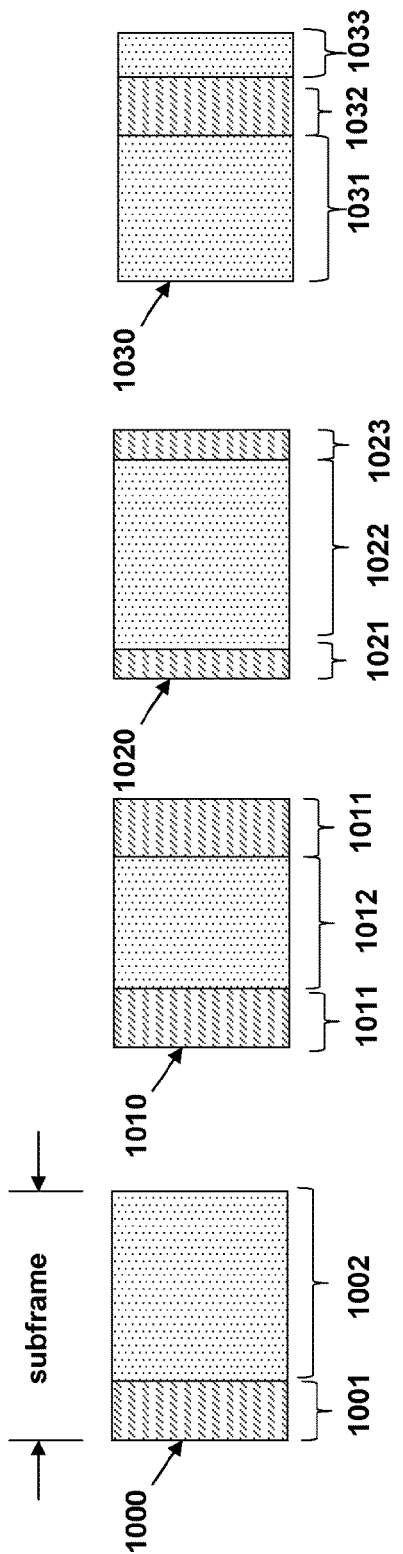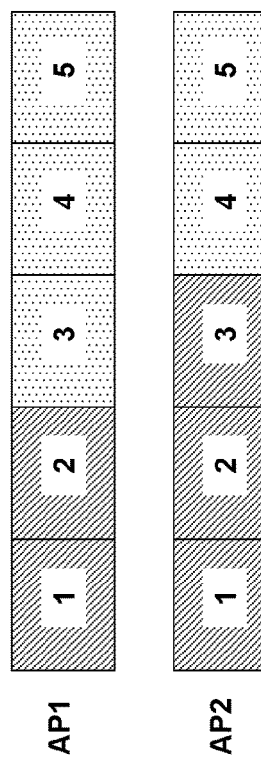

APPARATUS AND METHOD TO SET A CONTROL CHANNEL CONFIGURATION IN A COMMUNICATION SYSTEM

RELATED APPLICATION

This application was originally filed as Patent Cooperation Treaty Application No. PCT/IB2010/055967 filed Dec. 20, 2010.

TECHNICAL FIELD

The present invention is directed, in general, to communication systems and, in particular, to an apparatus, method and system to set a control channel configuration in a response to an indication of interference in a communication system.

BACKGROUND

Long term evolution ("LTE") of the Third Generation Partnership Project ("3GPP"), also referred to as 3GPP LTE, refers to research and development involving the 3GPP LTE Release 8 and beyond, which is the name generally used to describe an ongoing effort across the industry aimed at identifying technologies and capabilities that can improve systems such as the universal mobile telecommunication system ("UMTS"). The notation "LTE" is also used to refer to communication systems and components designed under 3GPP LTE standards. The notation "LTE-A" is generally used in the industry to refer to further advancements in LTE. The goals of this broadly based project include improving communication efficiency, lowering costs, improving services, making use of new spectrum opportunities, and achieving better integration with other open standards.

The evolved universal terrestrial radio access network ("E-UTRAN") in 3GPP includes base stations providing user plane (including packet data convergence protocol/radio link control/media access control/physical ("PDCP/RLC/MAC/PHY") sublayers) and control plane (including a radio resource control ("RRC") sublayer) protocol terminations towards wireless communication devices such as cellular telephones. A wireless communication device or terminal is generally known as user equipment (also referred to as "UE"). A base station is an entity of a communication network often referred to as a Node B or an NB. Particularly in the E-UTRAN, an "evolved" base station is referred to as an eNodeB or an eNB. For details about the overall architecture of the E-UTRAN, see 3GPP Technical Specification ("TS") 36.300 v8.7.0 (2008-12), which is incorporated herein by reference. For details of the communication or radio resource control management, see 3GPP TS 25.331 v.9.1.0 (2009-12) and 3GPP TS 36.331 v.9.1.0 (2009-12), which are incorporated herein by reference.

As wireless radio communication systems such as cellular telephone, satellite, and microwave communication systems become widely deployed and continue to attract a growing number of users, there is a pressing need to accommodate efficiently a large and variable number of communication devices that transmit an increasing quantity of data within a fixed spectral allocation and limited transmitter power levels. The increased quantity of data or traffic is a consequence of wireless communication devices transmitting video information and surfing the Internet, performing ordinary voice communications, and enabling communication among local processing devices such as personal computers and routers. Such processes are generally performed while accommodating substantially simultaneous operation of a large number of wireless communication devices.

The current development of the communication networks, therefore, is enabling the use of larger bandwidths for the associated communication systems. The larger bandwidth usage typically requires new rules and conventions for the spectrum handling. Thus, the communication system allocates spectrum based on the amount of traffic. Typically, if there is a reasonable amount of traffic, then the communication system allocates a primary communication channel. Occasionally, when the traffic load increases, the communication system may need to use larger amount of spectrum referred to as a secondary communication channel.

Local area networks ("LANs") designed under 3GPP LTE specifications can complement existing cellular communication systems (or networks) and standards such as global system for mobile communications ("GSM") networks, UMTS and high speed packet access ("HSPA") networks. The local area networks are targeted for inclusion in 3GPP LTE Release 12 of the technical specifications. Unlike a cellular communication network, a local area network can utilize the license-exempt spectrum to take advantage of the additional available bandwidth. Bands reserved for time division duplex ("TDD") operation are also candidates for local area networks with larger bandwidth.

Currently, wireless local area networks such as wireless fidelity ("Wi-Fi™") communication networks based on the Institute of Electronic and Electrical Engineers ("IEEE") family of Technical Standards 802.11 are targeted to operate on the 2.4 to 5 gigahertz ("GHz") license-exempt bands where LTE wireless communication networks may plan to operate. The IEEE family of Technical Standards 802.11 that describes local area networks has evolved over the past twenty years. The latest developments in throughput enhancements have resulted in Wi-Fi™ certification of wireless communication devices (or other communication system devices) under the recent IEEE Technical Standard 802.11n. The devices certified under IEEE Technical Standard 802.11n may utilize 2×20 megahertz ("MHz") transmission bandwidth.

A follow-on effort to improve throughput of wireless communication devices operating under the IEEE family of Technical Standards 802.11 is IEEE Technical Standard 802.11ac. Technical Standard 802.11ac is directed at operation of a wireless local area network ("WLAN") communication device that is capable of using 8×20 MHz=160 MHz channel bandwidth and classifies the applied operational communication channels into primary communication channels employing primary spectrum usage (e.g., communication channel used to allocate transmission opportunities ("TXOPs")) and secondary communication channels (e.g., communication channels that enable data transmission with larger bandwidth). A primary communication channel can be used to obtain communication resources (e.g., do random access to obtain transmission opportunities ("TXOPs")), whereas a secondary communication channel carry traffic during the transmission opportunities if the communication channels have been idle at least for a priority interframe spacing ("PIFS") before initiation of the transmission opportunities.

LTE-based communication systems or networks (which are also generally cellular communication systems that operate with scheduled communication resources) and Wi-Fi-type communication systems or networks (which are decentralized with, for instance, contention-based carrier sensing multiple access ("CSMA")) can create harmful mutual interference. Both communication system or network types generally do not operate well if deployed on the same communication channel, and interference between such communication systems or networks becomes an issue when such communication systems or networks share spectrum in a common physical area. Mixed communication system operation, however, can provide high levels of communication performance due to spectrum sharing by user equipment between coexisting cellular and local area network communication modes. Enhancements are thus needed for an LTE-based communication system or network to improve its reliability and operation in the presence of a local area network such as a Wi-Fi communication network operating partially or completely on the same communication channel.

Coexistence of a communication system with scheduled communication resources and a communication system employing contention-based communication resources has been an ongoing and challenging problem because such communication systems operate with different communication resource allocation processes. Such communication systems are not likely to be capable of exchanging signaling between each other in the near future.

To achieve better network throughput, future communication systems or networks that employ scheduled communication resources will need to coexist and operate efficiently in an environment with communication systems or networks that employ contention-based communication resources. Interference between such communication systems or networks should be resolved to provide reliable and efficient operation of each communication system or network type. Thus, there is need for an improved system and method that can addresses interference issues for wireless communication devices that may coexist in primary and secondary channels that avoid the deficiencies of present communication systems.

SUMMARY OF THE INVENTION

These and other problems are generally solved or circumvented, and technical advantages are generally achieved, by embodiments of the present invention, which include an apparatus, method and system to set a control channel configuration in a response to an indication of interference in a communication system. In one embodiment, an apparatus includes a processor and memory including computer program code. The memory and the computer program code are configured to, with the processor, cause the apparatus to detect interference for the apparatus operable on a communication system from another communication system, and provide an indication of the interference to a base station. The memory and the computer program code are further configured to, with the processor, cause the apparatus to receive an indication of a relocation of at least a portion of a control channel to a protected area in response to a signal from the base station.

The foregoing has outlined rather broadly the features and technical advantages of the present invention in order that the detailed description of the invention that follows may be better understood. Additional features and advantages of the invention will be described hereinafter, which form the subject of the claims of the invention. It should be appreciated by those skilled in the art that the conception and specific embodiment disclosed may be readily utilized as a basis for modifying or designing other structures or processes for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the invention, and the advantages thereof, reference is now made to the following descriptions taken in conjunction with the accompanying drawings, in which:

FIGS. 8A and 8B illustrate graphical representations of exemplary frame structures for an LTE-based communication system under a fractional load that provide an environment for application of the principles of the present invention;

FIGS. 10A to 10D illustrate graphical representations of four representative subframes for an LTE-based communication system in accordance with the principles of the present invention;

FIG. 11 illustrates a graphical representation of exemplary sequences of subframes for first and second access points for a LTE-based communication system in accordance with the principles of the present invention;

DETAILED DESCRIPTION OF ILLUSTRATIVE EMBODIMENTS

The making and using of the presently preferred embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

In view of the foregoing, the present invention will be described with respect to exemplary embodiments in a specific context of an apparatus, method and system to set a control channel configuration in a response to an indication of interference in a communication system. The apparatus, method and system are applicable, without limitation, to any communication system including existing and future 3GPP technologies such as UMTS, LTE, GSM, and its future variants such as 4th generation ("4G") communication systems.

Figure 1:
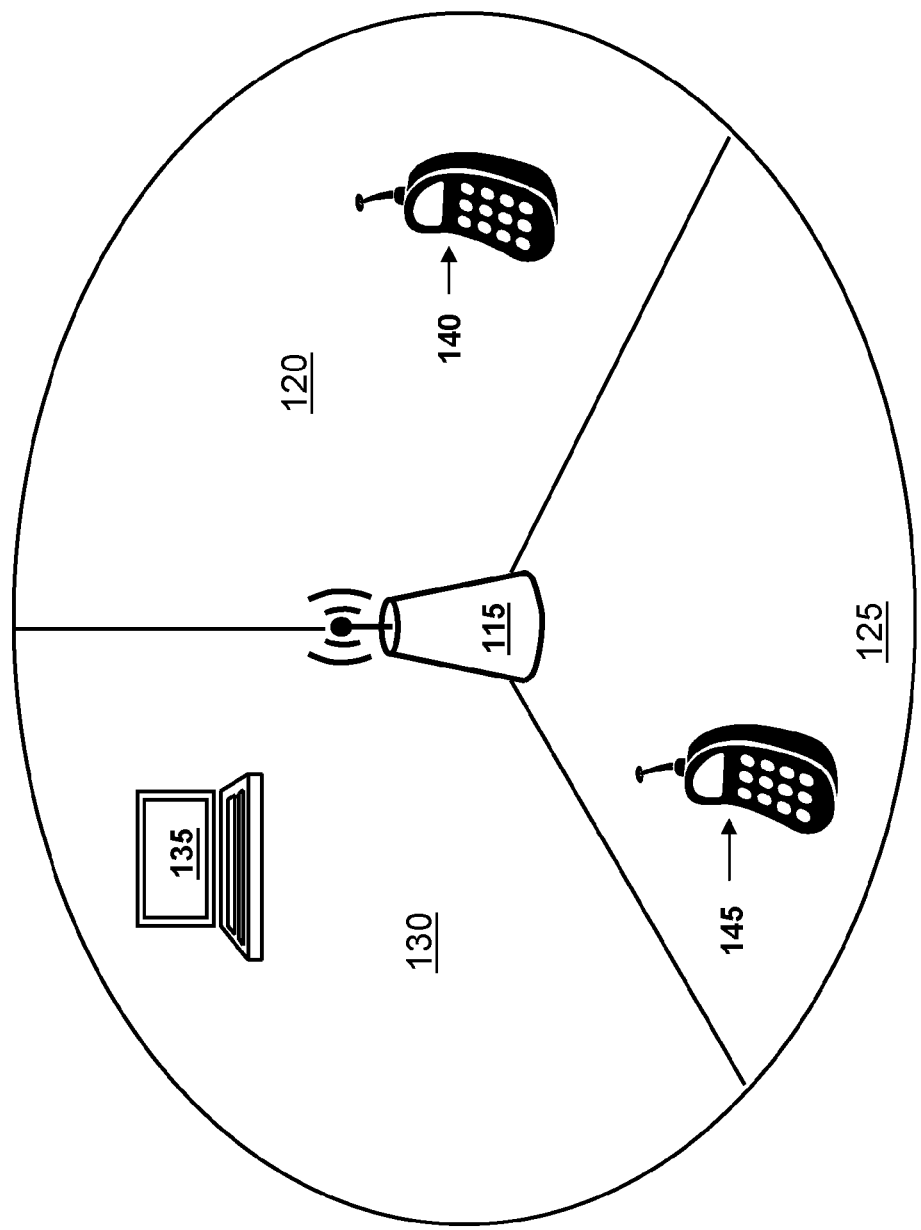
FIGS. 1 and 2 illustrate system level diagrams of embodiments of communication systems including a base station and wireless communication devices that provide an environment for application of the principles of the present invention.

Turning now to FIG. 1, illustrated is a system level diagram of an embodiment of a communication system including a base station 115 and wireless communication devices (e.g., user equipment) 135, 140, 145 that provides an environment for application of the principles of the present invention. The base station 115 is coupled to a public switched telephone network or other packet switched network that provides access to the intranet or Internet (not shown). The base station 115 is configured with a plurality of antennas to transmit and receive signals in a plurality of sectors including a first sector 120, a second sector 125, and a third sector 130, each of which typically spans 120 degrees. The three sectors or more than three sectors are configured per frequency, and one base station 115 can support more than one frequency. Although FIG. 1 illustrates one wireless communication device (e.g., wireless communication device 140) in each sector (e.g. the first sector 120), a sector (e.g. the first sector 120) may generally contain a plurality of wireless communication devices. In an alternative embodiment, a base station 115 may be formed with only one sector (e.g. the first sector 120), and multiple base stations may be constructed to transmit according to co-operative multi-input/multi-output ("C-MIMO") operation, etc.

The sectors (e.g. the first sector 120) are formed by focusing and phasing radiated signals from the base station antennas, and separate antennas may be employed per sector (e.g. the first sector 120). The plurality of sectors 120, 125, 130 increases the number of subscriber stations (e.g., the wireless communication devices 135, 140, 145) that can simultaneously communicate with the base station 115 without the need to increase the utilized bandwidth by reduction of interference that results from focusing and phasing base station antennas. Additionally, the wireless communication devices 135, 140, 145 may form communication nodes along with other devices in the communication system.

Figure 2:
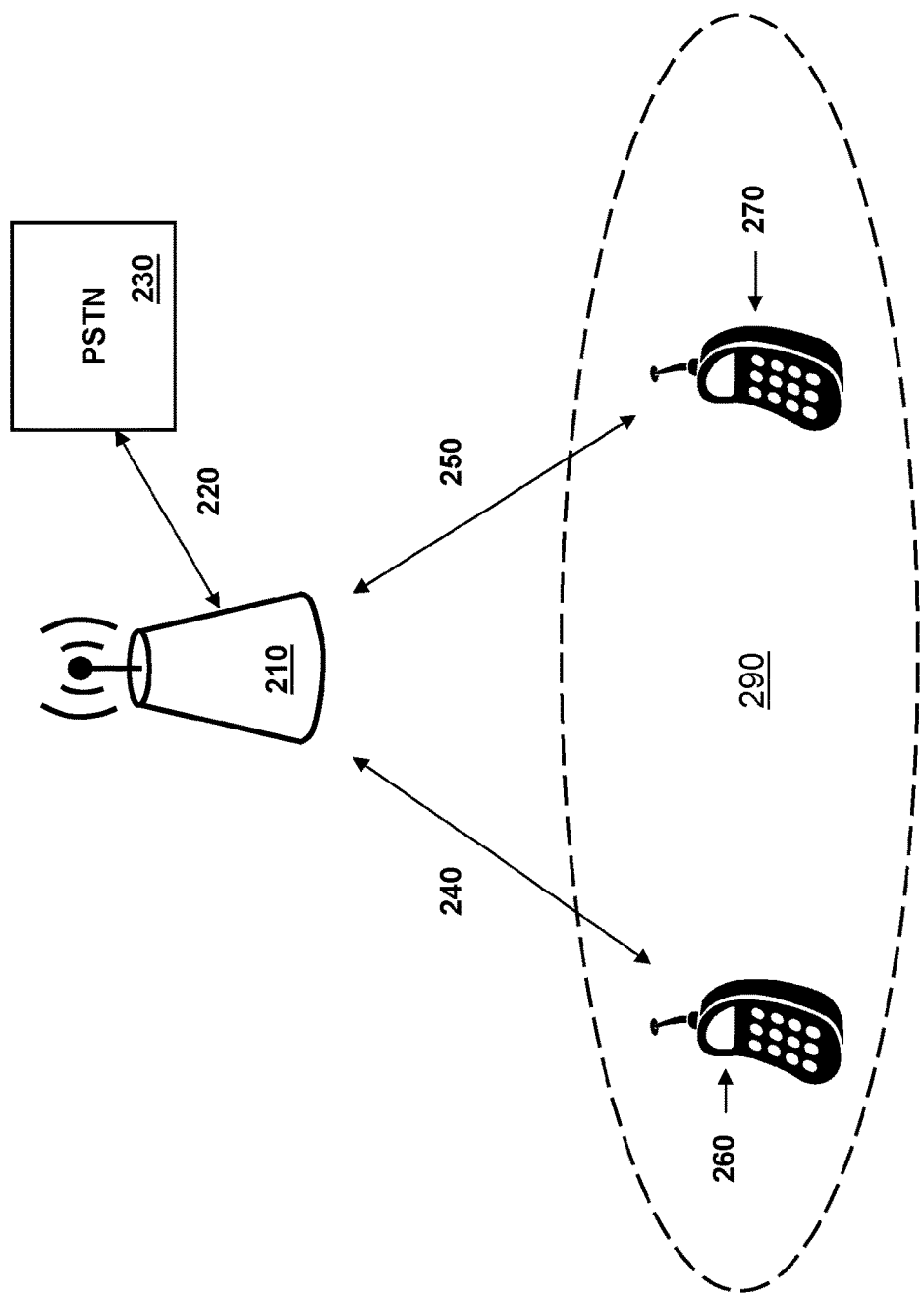

Turning now to FIG. 2, illustrated is a system level diagram of an embodiment of a communication system including a base station 210 and wireless communication devices (e.g., user equipment) 260, 270 that provides an environment for application of the principles of the present invention. The communication system includes the base station 210 coupled by communication path or link 220 (e.g., by a fiber-optic communication path) to a core telecommunications network such as public switched telephone network ("PSTN") 230 or other packet switched network that provides access to the intranet or Internet. The base station 210 is coupled by wireless communication paths or links 240, 250 to the wireless communication devices 260, 270, respectively, that lie within its cellular area 290.

In operation of the communication system illustrated in FIG. 2, the base station 210 communicates with each wireless communication device 260, 270 through control and data communication resources allocated by the base station 210 over the communication paths 240, 250, respectively. The control and data communication resources may include frequency and time-slot communication resources in frequency division duplex ("FDD") and/or time division duplex ("TDD") communication modes. Additionally, the wireless communication devices 260, 270 may form communication nodes along with other devices in the communication system.

Figure 3:
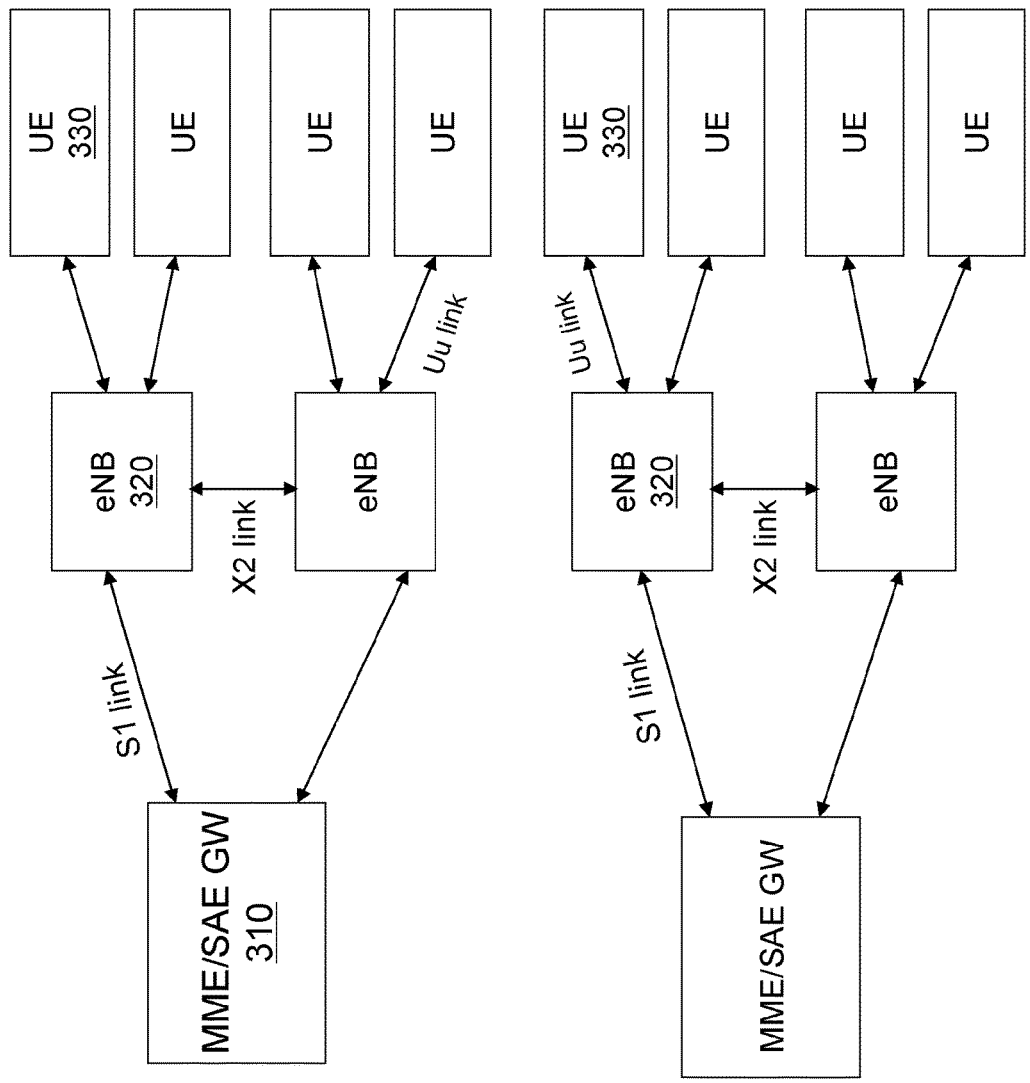
FIGS. 3 and 4 illustrate system level diagrams of embodiments of communication systems including wireless communication systems that provide an environment for application of the principles of the present invention.

Turning now to FIG. 3, illustrated is a system level diagram of an embodiment of a communication system including a wireless communication system that provides an environment for the application of the principles of the present invention. The wireless communication system may be configured to provide evolved UMTS terrestrial radio access network ("E-UTRAN") universal mobile telecommunications services. A mobile management entity/system architecture evolution gateway ("MME/SAE GW," one of which is designated 310) provides control functionality for an E-UTRAN node B (designated "eNB," an "evolved node B," also referred to as a "base station," one of which is designated 320) via an S1 communication link (ones of which are designated "S1 link") The base stations 320 communicate via X2 communication links (ones of which are designated "X2 link") The various communication links are typically fiber, microwave, or other high-frequency communication paths such as coaxial links, or combinations thereof.

The base stations 320 communicate with wireless communication devices such as user equipment ("UE," ones of which are designated 330), which is typically a mobile transceiver carried by a user. Thus, the communication links (designated "Uu" communication links, ones of which are designated "Uu link") coupling the base stations 320 to the user equipment 330 are air links employing a wireless communication signal such as, for example, an orthogonal frequency division multiplex ("OFDM") signal. Additionally, the user equipment 330 may form a communication node along with other devices in the communication system.

Figure 4:
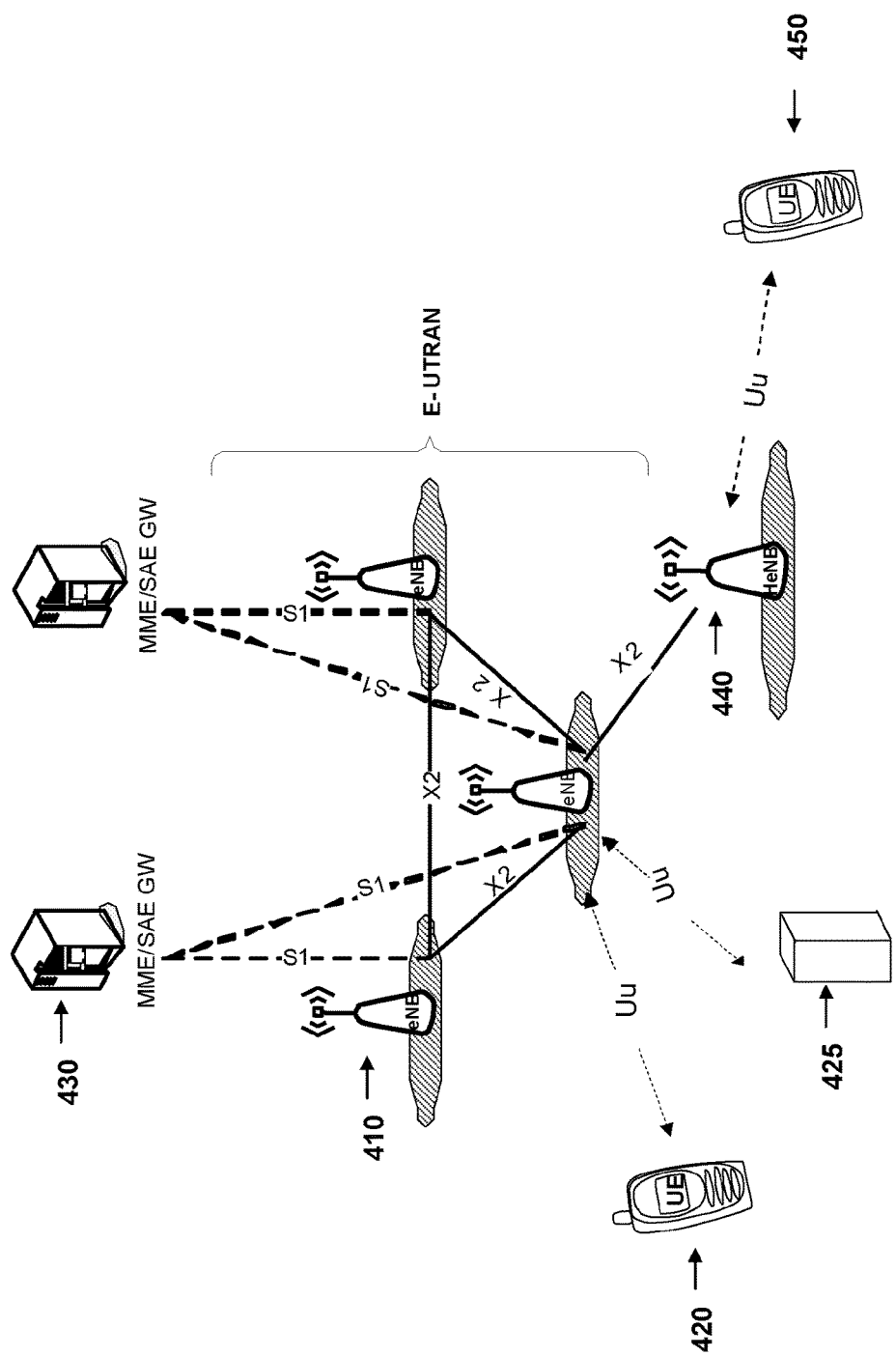

Turning now to FIG. 4, illustrated is a system level diagram of an embodiment of a communication system including a wireless communication system that provides an environment for the application of the principles of the present invention. The wireless communication system provides an E-UTRAN architecture including base stations (one of which is designated 410) providing E-UTRAN user plane (packet data convergence protocol/radio link control/media access control/physical) and control plane (radio resource control) protocol terminations towards wireless communication devices such as user equipment 420 and other devices such as machines 425 (e.g., an appliance, television, meter, etc.). The base stations 410 are interconnected with X2 interfaces or communication links (designated "X2") and are connected to the wireless communication devices such as user equipment 420 and other devices such as machines 425 via Uu interfaces or communication links (designated "Uu"). The base stations 410 are also connected by S1 interfaces or communication links (designated "S1") to an evolved packet core ("EPC") including a mobile management entity/system architecture evolution gateway ("MME/SAE GW," one of which is designated 430). The S1 interface supports a multiple entity relationship between the mobile management entity/system architecture evolution gateway 430 and the base stations 410. For applications supporting inter-public land mobile handover, inter-eNB active mode mobility is supported by the mobile management entity/system architecture evolution gateway 430 relocation via the S1 interface.

The base stations 410 may host functions such as radio resource management. For instance, the base stations 410 may perform functions such as Internet protocol ("IP")

header compression and encryption of user data streams, ciphering of user data streams, radio bearer control, radio admission control, connection mobility control, dynamic allocation of communication resources to user equipment in both the uplink and the downlink, selection of a mobility management entity at the user equipment attachment, routing of user plane data towards the user plane entity, scheduling and transmission of paging messages (originated from the mobility management entity), scheduling and transmission of broadcast information (originated from the mobility management entity or operations and maintenance), and measurement and reporting configuration for mobility and scheduling. The mobile management entity/system architecture evolution gateway 430 may host functions such as distribution of paging messages to the base stations 410, security control, termination of user plane packets for paging reasons, switching of user plane for support of the user equipment mobility, idle state mobility control, and system architecture evolution bearer control. The user equipment 420 and machines 425 receive an allocation of a group of information elements from the base stations 410. Additionally, the ones of the base stations 410 are coupled a home base station 440 (a device), which is coupled to devices such as user equipment 450 and/or machines (not shown). For a better understanding of home base stations (designated "HeNB"), see 3 GPP TS 32.781 v.9.1.0 (2010-03), which is incorporated herein by reference. Additionally, the user equipment 420 and machines 425 may form communication nodes along with other devices in the communication system.

Figure 5:
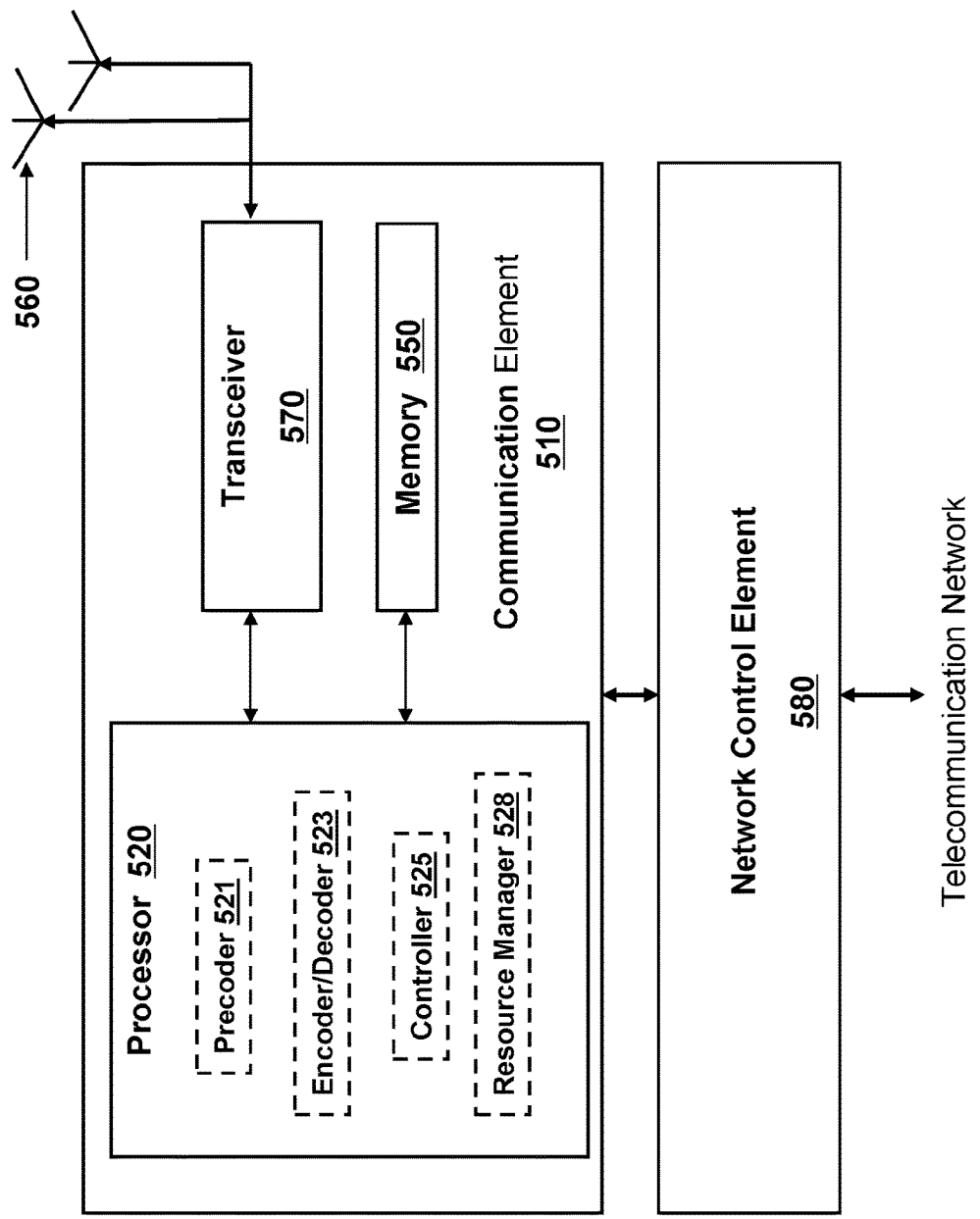
FIG. 5 illustrates a system level diagram of an embodiment of a communication element of a communication system for application of the principles of the present invention.

Turning now to FIG. 5, illustrated is a system level diagram of an embodiment of a communication element 510 of a communication system for application of the principles of the present invention. The communication element or device 510 may represent, without limitation, a base station, a wireless communication device (e.g., a subscriber station, terminal, mobile station, user equipment, machine), a network control element, a communication node, or the like. Additionally, the communication element or device 510 may form a communication node along with other devices in the communication system. When the communication element or device 510 represents a communication node such as a user equipment, the user equipment may be configured to communicate with another communication node such as another user equipment employing one or more base stations as intermediaries in the communication path (referred to as cellular communications). The user equipment may also be configured to communicate directly with another user equipment without direct intervention of the base station in the communication path (referred to a D2D communications). The communication element 510 includes, at least, a processor 520, memory 550 that stores programs and data of a temporary or more permanent nature, an antenna 560, and a radio frequency transceiver 570 coupled to the antenna 560 and the processor 520 for bidirectional wireless communications. The communication element 510 may be formed with a plurality of antennas to enable a multiple-input multiple output ("MIMO") mode of operation. The communication element 510 may provide point-to-point and/or point-to-multipoint communication services.

The communication element 510, such as a base station in a cellular communication system or network, may be coupled to a communication network element, such as a network control element 580 of a public switched telecommunication network ("PSTN"). The network control element 580 may, in turn, be formed with a processor, memory, and other electronic elements (not shown). The network control element 580 generally provides access to a telecommunication network such as a PSTN. Access may be provided using fiber optic, coaxial, twisted pair, microwave communications, or similar link coupled to an appropriate link-terminating element. A communication element 510 formed as a wireless communication device is generally a self-contained device intended to be carried by an end user.

The processor 520 in the communication element 510, which may be implemented with one or a plurality of processing devices, performs functions associated with its operation including, without limitation, precoding of antenna gain/phase parameters (precoder 521), encoding and decoding (encoder/decoder 523) of individual bits forming a communication message, formatting of information, and overall control (controller 525) of the communication element, including processes related to management of communication resources (resource manager 528). Exemplary functions related to management of communication resources include, without limitation, hardware installation, traffic management, performance data analysis, tracking of end users and equipment, configuration management, end user administration, management of wireless communication devices, management of tariffs, subscriptions, security, billing and the like.

For instance and when the communication element 510 is embodied in a base station, the resource manager 528 (in accordance with the memory 550) is configured to ascertain an indication of interference to, for instance, a user equipment operable on a communication system (e.g., a cellular communication system) from another communication system (e.g., a Wi-Fi communication system), and produce a signal in response to the indication of interference to relocate (or move) at least a portion of a control channel to a protected area. The resource manager 528 may ascertain the indication of interference by receiving the same from the user equipment or other communication element or may detect the indication of interference itself. When the communication element 510 is embodied in a user equipment, the resource manager 528 (in accordance with the memory 550) is configured to detect interference for the user equipment operable on a communication system (e.g., a cellular communication system) from another communication system (e.g., a Wi-Fi communication system), provide an indication of the interference to a base station, and receive an indication of a relocation of at least a portion of a control channel to a protected area in response to a signal from the base station.

The execution of all or portions of particular functions or processes related to management of communication resources may be performed in equipment separate from and/or coupled to the communication element 510, with the results of such functions or processes communicated for execution to the communication element 510. The processor 520 of the communication element 510 may be of any type suitable to the local application environment, and may include one or more of general-purpose computers, special purpose computers, microprocessors, digital signal processors ("DSPs"), field-programmable gate arrays ("FPGAs"), application-specific integrated circuits ("ASICs"), and processors based on a multi-core processor architecture, as non-limiting examples.

The transceiver 570 of the communication element 510 modulates information on to a carrier waveform for transmission by the communication element 510 via the antenna(s) 560 to another communication element. The transceiver 570 demodulates information received via the antenna(s) 560 for further processing by other communication elements. The transceiver 570 is capable of supporting duplex operation for the communication element 510.

The memory 550 of the communication element 510, as introduced above, may be one or more memories and of any type suitable to the local application environment, and may be implemented using any suitable volatile or nonvolatile data storage technology such as a semiconductor-based memory device, a magnetic memory device and system, an optical memory device and system, fixed memory, and removable memory. The programs stored in the memory 550 may include program instructions or computer program code that, when executed by an associated processor, enable the communication element 510 to perform tasks as described herein. Of course, the memory 550 may form a data buffer for data transmitted to and from the communication element 510. Exemplary embodiments of the system, subsystems, and modules as described herein may be implemented, at least in part, by computer software executable by processors of, for instance, the wireless communication device and the base station, or by hardware, or by combinations thereof. As will become more apparent, systems, subsystems and modules may be embodied in the communication element 510 as illustrated and described herein.

LTE-based communication systems (again, typically cellular communication systems) employ control channels that contain certain information for operation thereof such as scheduling grants, acknowledgements, channel quality information ("CQI"), scheduling requests, etc. Modifications to the LTE-based communication system are introduced herein that advantageously increase robustness of control channel transmissions in the case of coexistence of multiple communications systems including, for instance, a local area network (e.g., a Wi-Fi communication system) that can increase spectral efficiency of the LTE-based communication system. Enhancements are made to control channel definitions for the LTE-based communication system that can provide to improved reliability and operation in the presence of another communication system partially or completely on the same communication channel.

Figure 6:
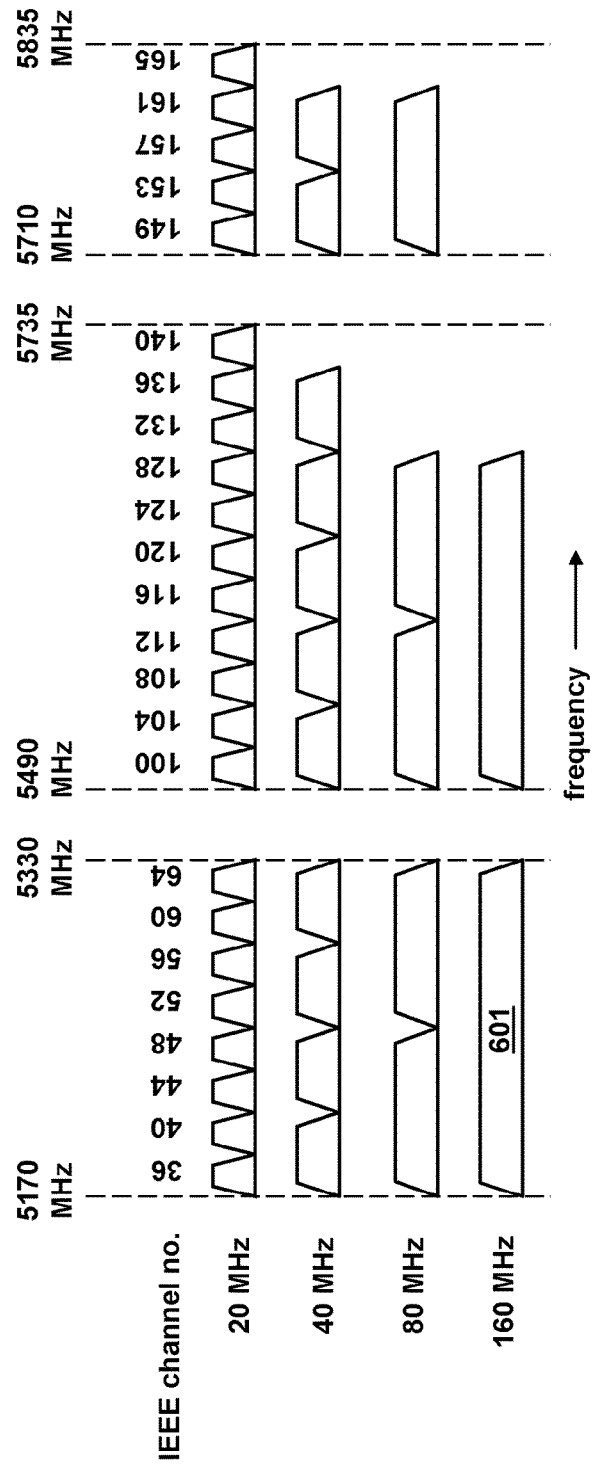
FIG. 6 illustrates a graphical representation of exemplary communication channels for communications under IEEE Technical Standard 802.11ac that provide an environment for application of the principles of the present invention.

Turning now to FIG. 6, illustrated is a graphical representation of exemplary communication channels for communications under IEEE Technical Standard 802.11 ac that provide an environment for application of the principles of the present invention. Conventional 20 and 40 MHz communication channels in the frequency range of 5170 MHz to 5835 MHz are illustrated with their associated IEEE channel number. Wider bandwidth communication channels with bandwidth of 80 MHz and 160 MHz for use in the United States are also illustrated in the FIGURE such as the 160 MHz communication channel designated with reference number 601 that spans IEEE channel number from 36 to 64.

Figure 7:
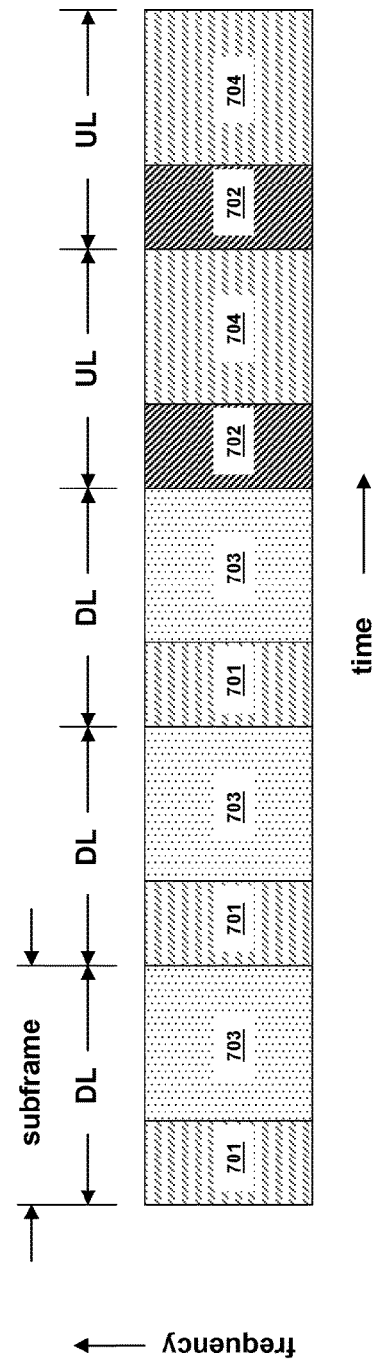
FIG. 7 illustrates a graphical representation of an exemplary frame structure for an LTE-based communication system including downlink and uplink subframes that provide an environment for application of the principles of the present invention.

Turning now to FIG. 7, illustrated is a graphical representation of an exemplary frame structure for an LTE-based communication system including downlink and uplink subframes that provide an environment for application of the principles of the present invention. Time is represented along the horizontal axis and frequency along the vertical axis of the FIGURE. Downlink control channels 701 and downlink data channels 703 are shown in each downlink subframe. Correspondingly, uplink control channels 702 and uplink data channels 704 are also shown in each uplink subframe. In this example, there is a 3:2 balance between downlink and uplink subframes and the communication system is fully loaded. In further advancements of the LTE, the uplink is assumed to utilize the same multiple access scheme as the downlink (i.e., both link directions utilize orthogonal frequency division multiple access ("OFDMA")). The uplink control channels are hence mapped to similar locations as downlink control channels.

Turning now to FIGS. 8A and 8B, illustrated are graphical representations of exemplary frame structures for an LTE-based communication system under a fractional load that provide an environment for application of the principles of the present invention. Again, time is represented along the horizontal axis and frequency along the vertical axis of the FIGUREs. Downlink control channels 801 and downlink data channels 803 are shown in each downlink subframe, and uplink control channels 802 and uplink data channels 804 are again illustrated. The exemplary 3:2 balance between downlink and uplink subframes is preserved in FIGS. 8A and 8B. FIG. 8A illustrates frequency-selective allocation of communication resources, and FIG. 8B places a priority on time-domain multiplexing. In both cases, the same number of communication resources are used for data transmission, but the implementation in FIG. 8A may be a challenge for coexistence with a Wi-Fi communication system because each subframe carries an active transmission.

Wi-Fi communication systems use enhanced distributed channel access ("EDCA") that is based on the principle of carrier sense multiple access with collision avoidance ("CSMA/CA"). A communication system employing EDCA calculates a random timing backoff whenever a communication channel is considered to be idle. When the timing backoff is reduced to zero, the Wi-Fi communication devices may transmit. The communication channel is considered to be idle when the power level of the communication channel as measured by a clear channel assessment ("CCA") process is below a predefined and standardized threshold level. When continuous transmissions occur, the Wi-Fi communication system would detect a free communication channel very rarely, and random backoff calculations will only rarely allow Wi-Fi communication devices to transmit. The implementation illustrated in FIG. 8B that shows subframes, such as downlink subframe formed with data channel 803 that carries no traffic and uplink subframe formed with data channel 804 that also carries no traffic, may be more accommodating to coexistence with a Wi-Fi communication system, since a Wi-Fi communication system is capable of calculating a timing backoff and transmitting during free subframes.

Wi-Fi communication channel access is pre-emptive, and such communication systems operate well when the communication devices can transmit traffic as soon as it arrives at the respective device. When transmissions are blocked, traffic is buffered in the Wi-Fi communication devices. After transmissions are again possible, it is likely that many Wi-Fi communication devices will have retained buffered data and will try to transmit traffic. Thus, it is likely that idle periods after LTE-based transmissions will have peaks of wireless local area network transmissions. The LTE-based transmissions can block Wi-Fi communication devices in the area for longer duration than the Wi-Fi communication devices are designed to accommodate.

Typically, wireless local area network transmission flows contain individually addressed frames that may each have varying duration. A respective receiver (i.e., communication device) of the frames acknowledges reception of the frames. A wireless local area network transmitter (i.e., communication device) transmits frames and receives acknowledgements: (1) until all frames are transmitted, (2) until acknowledgement for a transmitted frame is not successfully received, or (3) until a maximum transmission opportunities time limit is reached (e.g., 1.5 to 3 millisecond ("ms")). It is a likely case that LTE-based transmissions will corrupt ongoing wireless local area network transmissions, and that the wireless local area network transmissions will terminate due to lack of an acknowledgement.

Figure 9:
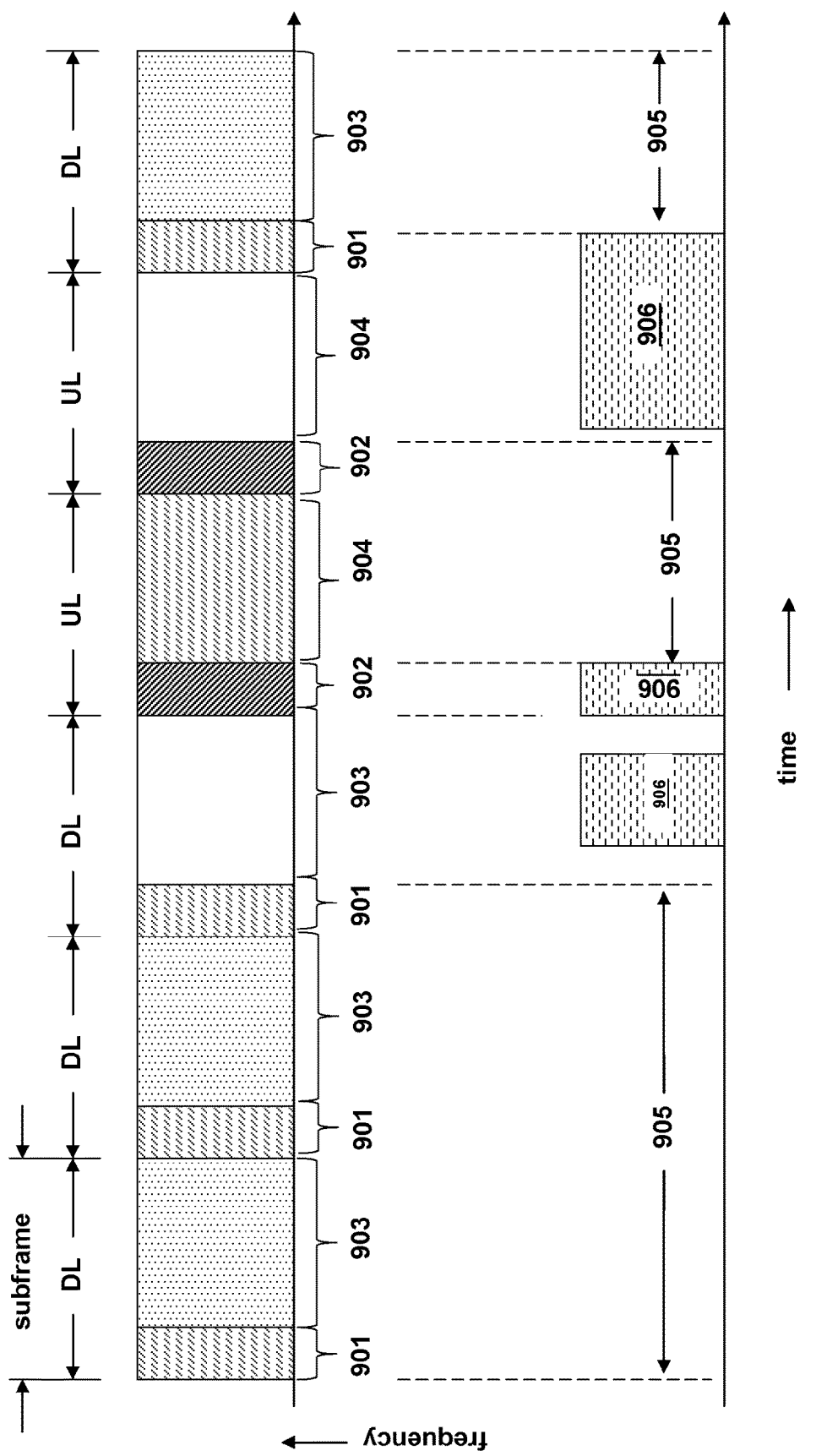
FIG. 9 illustrates a graphical representation of exemplary frame structures for an LTE-based communication system and a Wi-Fi communication system that provide an environment for application of the principles of the present invention.

Turning now to FIG. 9, illustrated is a graphical representation of exemplary frame structures for an LTE-based communication system and a Wi-Fi communication system that provide an environment for application of the principles of the present invention. In accordance with the LTE-based communication system, downlink control channels 901 and downlink data channels 903 are shown in each downlink subframe. Correspondingly, uplink control channels 902 and uplink data channels 904 are also shown in each uplink subframe. It should be noted that ones of the communication channels introduced herein may differ in design from the strict LTE communication channels. For instance, the uplink control channels 902 employ different control channel mapping to physical channels, which is similar to the mapping employed by the downlink communication channels (see, e.g., U.S. patent application Ser. No. 12/610,836, entitled "Method and Apparatus for Synchronizing Resources for Coordinated Network Deployment," by Ribeiro, et al., filed Nov. 2, 2009, which is incorporated herein by reference). In accordance therewith, the references herein to LTE-based should be understood to include modifications to or variants of analogous systems, channels, components, etc. of the 3GPP LTE communication system. In accordance with the Wi-Fi communication system, areas designated 905 represent time periods wherein the LTE-based communication system is busy and data channels 906 represent time periods wherein data is being transmitted/received therein. In the illustrated embodiment, a scheduler embodied, for instance, in a resource manager of a communication element of a LTE-based communication system provided subframes that carry no traffic, and follows fixed frame timing with fractional load. As a result, many control channel transmissions at the beginning of the subframe may be corrupted by W-Fi transmissions. In FIG. 9, it can be seen that control channels in the beginning of LTE-based subframes that are preceded by subframes that carry no traffic are most likely to correspond to the situation wherein the Wi-Fi communication device has been capable of reducing the backoff to zero and the Wi-Fi communication device has started to transmit. Hence, the LTE-based transmissions and the Wi-Fi transmissions tend to collide and corrupt each other.

Detection of Wi-Fi activity can be performed within a communication element (e.g., a base station or user equipment) of the LTE-based communication system. There are a number of alternatives to detect Wi-Fi activity. One alternative is to detect a higher interference level than an interference level expected from neighboring communication systems. Another alternative is to include a spectrum sensor in a communication element that is configured to detect Wi-Fi interference. As introduced herein, arrangements of LTE-based control channels are employed to increase robustness of a LTE-based communication system against interference produced by a neighboring Wi-Fi communication system.

Control information is of substantial importance in a LTE-based communication system because, for example, a downlink control channel generally includes, without limitation, scheduling grants for downlink and uplink transmissions, format indication of the control channel itself, and acknowledgements for previous uplink transmissions, all of which are essential to maintain reliable communication. Allocation of higher-layer, cell-specific control information may also be included in the control channel.

As illustrated in FIG. 9, LTE-based subframes immediately following an empty subframe are more vulnerable to having Wi-Fi transmissions causing interference to the LTE-based communication system due to the nature of the carrier sensing mechanism. Thus, in general LTE control channels should not be transmitted immediately after empty LTE-based subframes. If control channels are transmitted immediately after empty subframes, in the presence of a neighboring Wi-Fi communication system, control channels should be repeated in a more reliable location. Wireless local area network communication devices are less likely to initiate transmissions in frequency bands that have had ongoing transmissions in the previous subframes or after having had a transmission in the current subframe for a certain time. These communication resources are referred to herein as protected areas (e.g., frequency bands that have had ongoing transmissions in previous subframes for a certain period of time, or after having had transmissions in a current subframe for a certain period of time). To implement LTE-based control channel protection, a coexistence mode (e.g., coexistence with a neighboring Wi-Fi communication system) with modified control channels is signaled to the user equipment. Wi-Fi activity is detected and coordinated with LTE-based communication systems. For protection of LTE-based control channel information, the exemplary options as set forth herein may be utilized.

Turning now to FIGS. 10A to 10D, illustrated are graphical representations of four representative subframes for an LTE-based communication system in accordance with the principles of the present invention. The first subframe 1000 as illustrated in FIG. 10A includes an unprotected control channel 1001 and data channel 1002. One option to protect LTE-based control channel information for vulnerable subframes is to repeat control channel information in a protected area. In this case, the downlink control channels are repeated in an OFDM symbol that is sufficiently distant from the beginning of the subframe such that a Wi-Fi communication device is likely to have stopped transmissions and LTE transmissions are likely to be blocking the Wi-Fi communication system from obtaining new transmission opportunities. This option is illustrated in FIG. 10B by a second subframe 1010 wherein control channel 1011 is repeated at the end of subframe 1010 with a data channel 1012 located therebetween. For downlink allocations to be feasible within the same subframe, user equipment is instructed to store several soft symbols in the subframe prior to decoding. This increased overhead can be partially compensated by adjusting the modulation and coding schemes used in the control channel to take into account the repetition of information.

A second option to protect LTE-based control channel information is to split downlink and uplink allocations. Preferably, at least part of the control channel information is sent in a protected area. Control channels in the beginning of a subframe carry information related to downlink allocations. The uplink scheduling information and acknowledgements are transmitted in a second set of control channels that are transmitted in a subframe such that a Wi-Fi communication system will have stopped transmissions and the LTE transmissions will be blocking the Wi-Fi communication system from obtaining new transmission opportunities. This option is illustrated in FIG. 10C by a third subframe 1020 wherein control channel information is separated into a first control channel 1021 and a second control channel 1023 with a data channel 1022 therebetween (i.e., split control channels). This second option is a compromise for the first option for the case wherein the user equipment is not able to store enough soft symbols to decode downlink transmissions.

A third option to protect LTE control channel information is to relocate (or move) all control channels relative to their default position to a protected area in the frame. In this case, all downlink control channels are relocated to a subframe or subframe area such that Wi-Fi communication system has stopped transmissions and the LTE transmissions are blocking the Wi-Fi communication system from obtaining new transmission opportunities. This is illustrated in FIG. 10D by a fourth subframe 1030 wherein control channel 1032 is displaced to a later portion of subframe 1030, with data channel 1031 placed at the beginning of the subframe, and data channel 1033 placed at the end of the subframe. This option employs the least overhead, with the same requirements on storing soft symbols as described with respect to the first option.

The uplink control channels include a random access channel ("RACH"), channel quality indicator feedback, acknowledgements, and scheduling requests. For protection of this LTE uplink information the following options apply. One option is to relocate all LTE uplink control channels to a protected area. The uplink control channels do not include scheduling information, and hence the location of the control channels in the frame is not critical for reception. However, the uplink reference symbols are useful in the beginning of the subframe to avoid storing soft symbols at the base station for reception until the reference symbols are transmitted, with a corresponding delay in the decoding process. Moreover, in order to exploit opportunities for orthogonalization between uplink and downlink control channels in crossed slots where the uplink of one communication system overlaps in time and frequency with the downlink transmission of another communication system, it is important that they are located in the same area of the subframe. The uplink control channels can be repeated in a protected area. Repeating uplink control channels may still be needed in the case wherein the Wi-Fi communication system has a transmission ongoing in LTE subframes after idle subframes.

For signaling of coexistence mode with modified control channels to the user equipment in a LTE-based communication system, there are several possibilities to signal coexistence mode with control channels to the user equipment. In one possibility, an additional system information block can be introduced to cover all coexistence-related signaling, including the modified subframes and the position of control channels in those subframes. In another possibility, part of the control channel can be masked with a known sequence to support blind detection of the control channel position by the user equipment. In this case, the set of feasible control channel locations can be pre-defined by a standard or informed to the user equipment by higher-layer signaling. Another option is indication in the downlink control channels that there is a repetition or split of the control channel information in the subframe. Another option is higher-layer signaling to configure a coexistence mode of operation.

For coordination with neighboring LTE-based communication systems, once harmful Wi-Fi interference is detected in the neighborhood, the access points switch to a coexistence mode including the modified control channels as described herein. Coexistence with a Wi-Fi communication system is improved if there is agreement among the access points of which subframes to use to concentrate data transmissions. For example, access points may agree to allocate user equipment with a certain traffic pattern to create suitable gaps in the time domain.

Turning now to FIG. 11, illustrated is a graphical representation of exemplary sequences of subframes for first and second access points (designated "AP1" and "AP2," respectively) for a LTE-based communication system in accordance with the principles of the present invention. For the purposes of this example, downlink allocations proceed in ascending order of subframe number, and uplink allocations proceed in descending order (e.g., uplink subframe 5 is allocated by a communication resource allocation process performed in a resource manager of a communication element before uplink subframe 4 is allocated). It should be noted that the first two subframes for the first access point are downlink subframes and the last three subframes are uplink subframes. Additionally, the first three subframes for the second access point are downlink subframes and the last two subframes are uplink subframes.

The time axis proceeds from left to right. In this manner it is likely that subframe 3 in both access points eventually becomes empty. Subframes 2 and 4 are less likely to become empty. Hence, the LTE control channel in subframe 4 should have higher priority on being protected. The LTE control channel in subframe 1 is also necessary to protect since the Wi-Fi communication devices measure different received signal strength indicator ("RSSI") values during uplink and downlink phases of LTE-based communication systems. The actual subframes wherein LTE control channels need to be protected also depend on the activity pattern of each cell. For example, if access point 1 in FIG. 11 has insufficient downlink traffic to fill the downlink subframes, but a large amount of uplink traffic, then protection of LTE control channels in subframe 3 is more relevant than protection of control channels in subframe 4.

In order to avoid harmful uplink-to-downlink and downlink-to-uplink interference, neighboring LTE-based communication systems with strong coupling preferably have a common location of important control channels in the modified subframe. This allows for orthogonalization of control channels among access points, even in case of uplink-to-downlink and downlink-to-uplink interference. The detection of LTE-based communication systems with strong coupling can be based on path-loss measurements between base stations or interference measurements by a user equipment associated with a base station. It is noted that path-loss measurements per se are well understood in the art. This step is preferable, since in the case wherein signals in control channels in different cells are not orthogonal to each other, or if there is no need to coordinate downlink-to-uplink switching points, then coordination between base stations may not necessary. In order to limit signaling load, possible locations of control channels should be limited to a small set, which in turn is defined in an industrial standard. Another option is to have the locations of control channels fixed and defined in a standard regardless of coupling between base stations. A base station may advantageously request from a neighboring base station to employ coexistence mode when it detects harmful Wi-Fi interference.

Figure 12:
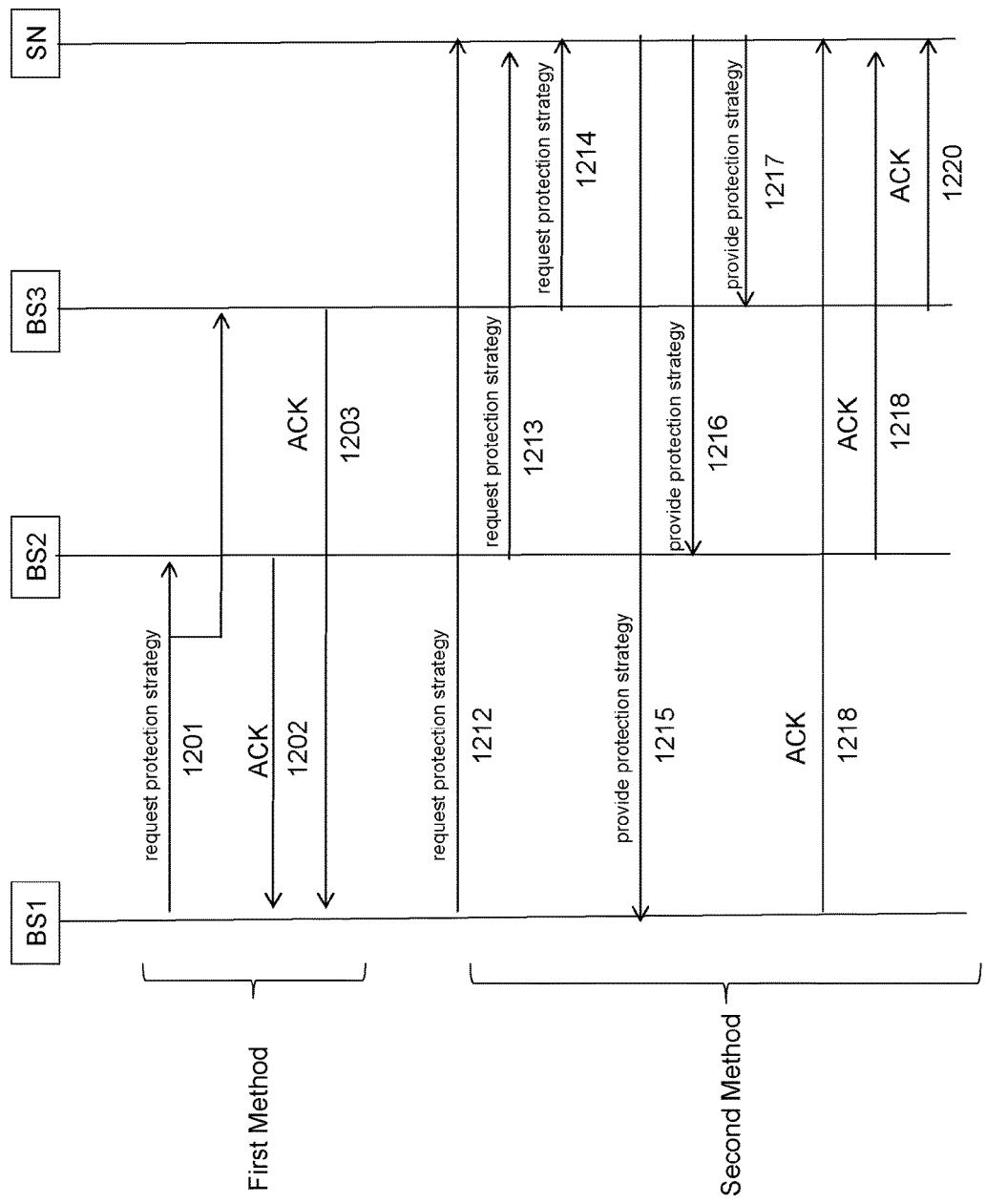
FIG. 12 illustrates a signaling diagram of exemplary methods to request a coexistence mode in accordance with the principles of the present invention.

Turning now to FIG. 12, illustrated is a signaling diagram of exemplary methods to request a coexistence mode in accordance with the principles of the present invention. The method is illustrated with respect to first, second and third base stations BS1, BS2, BS3 and a support node SN. If there is a direct "X2" interface between the base stations, the messages may be sent directly between the base stations. In a first step 1201 of the first method, after determining a need to protect control channels due to interference or potential interference with another communication system such as a wireless local area network, the first base station BS1 negotiates/proposes subframes to be protected and a protection strategy. A communication resource allocation pattern is negotiated. In this example, the second and third base stations BS2, BS3 respond to the first base station BS1 with acknowledgments ("ACKs") 1202, 1203 agreeing to a protection strategy. An option is to use user equipment to relay the messages to neighboring base stations if there is no direct interface such as an "X2" interface between the base stations.

If a direct interface between the base stations is not possible (e.g., because the LTE-based communication systems operate in different subnets), communication related to a protection strategy can be facilitated by a support node ("SN") as illustrated by second method. A support node is another communication system control element coupled to the base stations such as mobile management entity/system architecture evolution gateway. In first steps 1212, 1213, 1214 of the second method, the first, second and third base stations BS1, BS2, BS3 request or identify subframes to be protected and a protection strategy, and transmit the request to the support node SN. The base station requests through support node a communication resource allocation pattern. In second steps 1215, 1216, 1217 of the second method, the support node SN provides to the first, second and third base stations BS1, BS2, BS3, the requested information on protected subframes and the protection strategy, if such strategy was not previously available, and informs the first, second and third base stations BS1, BS2, BS3 of a communication resource allocation pattern including the allocation pattern for the control channels. Of course, support node SN may inform the first, second and third base stations BS1, BS2, BS3 of the communication resource allocation pattern without the requested information. In third steps 1218, 1219, 1220 of the second method, the first, second and third base stations BS1, BS2, BS3 provide an acknowledgment ACK of the information to the support node SN. The support node SN can then relay the acknowledgment back to the other base stations. It should be understood that the support node SN may provide protection strategy to one or all of the base stations, with or without a request for the protection strategy.

A base station should preferably have the option to opt-out of the coordination for dealing with interference. For example, a base station that does not sense any Wi-Fi interference would prefer to be free to schedule user equipment in a beneficial way from its own perspective. However, it may still be disrupted from Wi-Fi transmissions in a neighboring cell (or base station), in which case it would be better to follow the coordination. Coordination may be restricted to the immediate physical neighborhood of a communication node (such as a base station) that detects Wi-Fi interference. However, the total number of communication nodes to be involved in the coordination depends, for instance, on the Wi-Fi interference seen by neighboring communication nodes themselves, and if they depend on orthogonalization of control channels with another neighboring communication node outside of the interference region.

Figure 13:
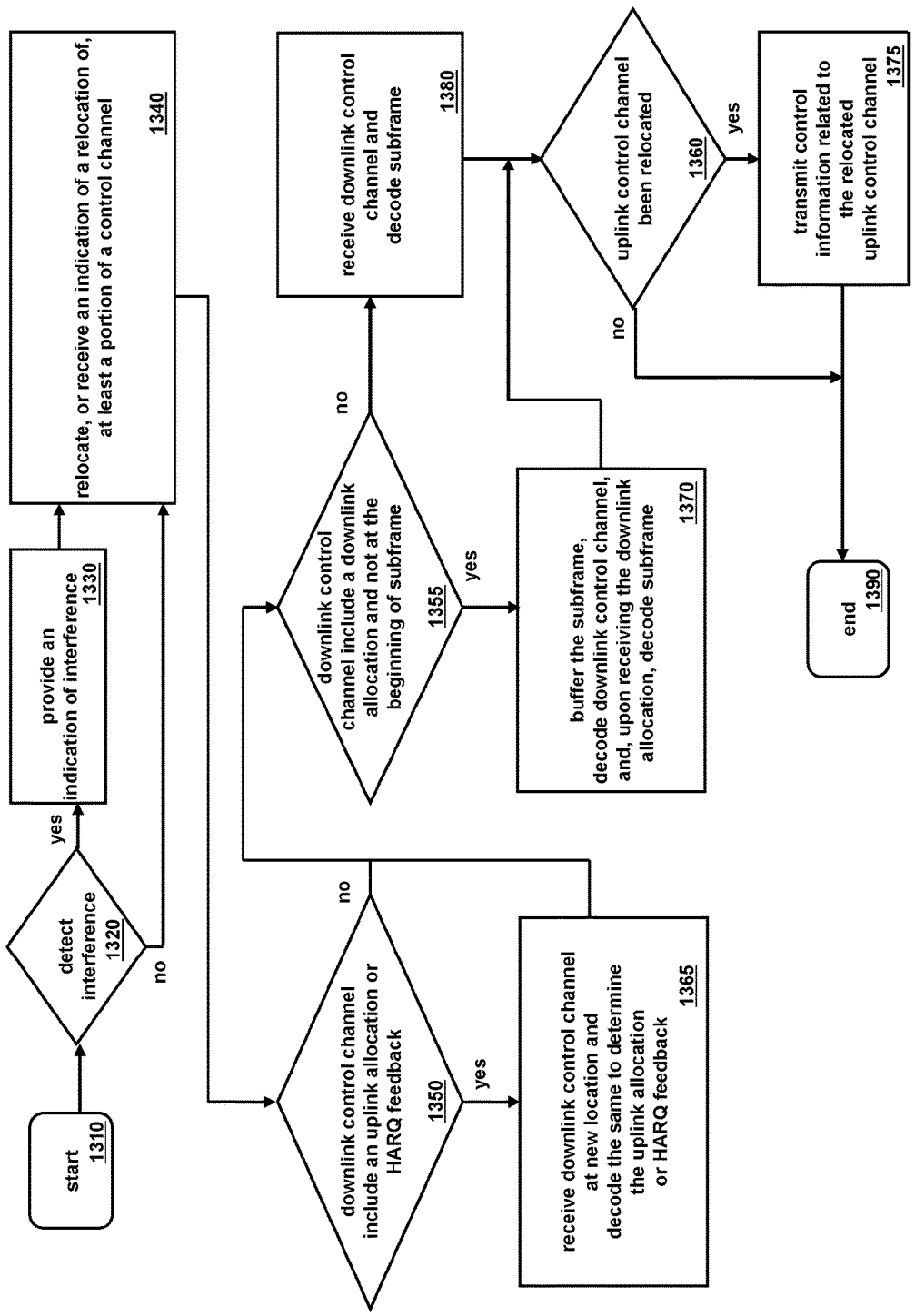
FIGS. 13 and 14 illustrate flow diagrams of embodiments of methods of operating communication elements in accordance with the principles of the present invention.

Turning now to FIG. 13, illustrated is a flow diagram of an embodiment of a method of operating a communication element (e.g., user equipment) in accordance with the principles of the present invention. The method begins at a step or module 1310. In step or module 1320, the user equipment operable in a communication system (e.g., a cellular communication system) detects interference from another coexisting communication system (e.g., a local area network). Interference can be detected, without limitation, by sensing a signal in a communication channel greater than a threshold level. If interference is detected, the user equipment provides an indication of interference to a serving base station in a step or module 1330. Thereafter, the user equipment receives a signal from the base station to relocate (or move) at least a portion of an uplink control channel to a protected area, or to indicate that at least a portion of a downlink control channel should be relocated by, for instance, the base station in a step or module 1340. The base station transmits this signal to the user equipment in response to the indication of the detected interference from the user equipment as provided above, or in response to its own detection of interference.

Following the step or module 1340, multiple tests may be performed by the user equipment. It should be understood that the tests can be performed in a different order, and are performed after the respective control channels have been relocated (or moved). Furthermore, the outcomes of the tests are applied to the respective subframes until the control channel configuration is changed again. In a step or module 1350, the user equipment determines if a portion of the downlink control channel includes an uplink allocation (e.g., that may not be at the beginning of a current subframe or is in a different subframe) or a hybrid automatic repeat request ("HARQ") feedback. If the user equipment makes that determination, the user equipment receives the downlink control channel at the new location and decodes the control channel to determine the uplink allocation or the hybrid automatic repeat request feedback in a step or module 1365. If the user equipment does not make that determination, the user equipment determines if a portion of the downlink control channel includes a downlink allocation that is not at the beginning of the subframe in a step or module 1355. If a portion of the downlink control channel includes the downlink allocation that is not at the beginning of the subframe, the user equipment buffers the subframe (e.g., from the beginning and including a base band signal, a plurality of soft symbols or other signal format), decodes the downlink control channel and, upon receiving the downlink allocation, decodes the subframe in a step or module 1370. If a portion of the downlink control channel does not contain a downlink allocation that is not at the beginning of the subframe, the user equipment receives the downlink control channel and decodes the subframe following a normal decoding procedure in a step or module 1380.

The user equipment then proceeds with the test in a step or module 1360 wherein the user equipment determines if a portion of the uplink control channel has been relocated (or moved). If a portion of the uplink control channel has been relocated, the user equipment provides (or transmits) control information related to the relocated uplink control channel in a step or module 1375. The process ends at step or mode 1390.

Figure 14:
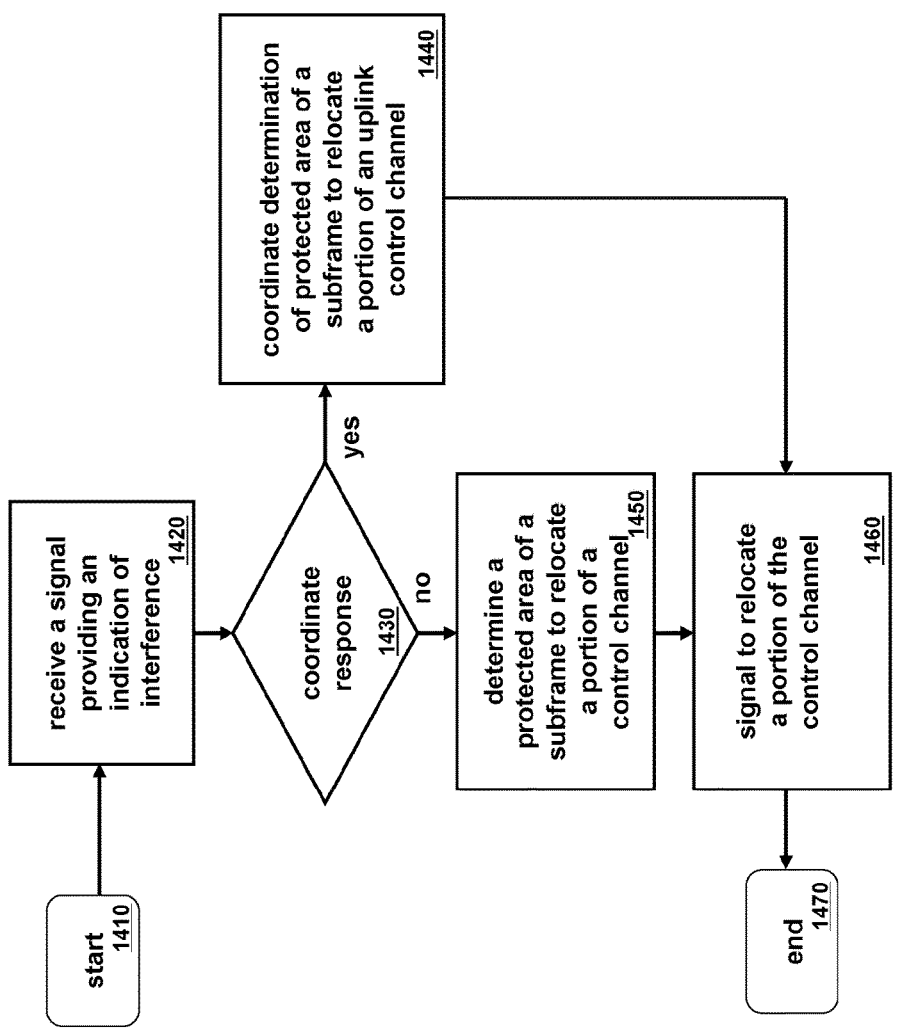

Turning now to FIG. 14, illustrated is a flow diagram of an embodiment of a method of operating a communication element (e.g., base station) in accordance with the principles of the present invention. The method begins at a step or module 1410. In a step or module 1420, the base station ascertains an indication of interference by, for instance, receiving a signal from a user equipment providing the indication of interference. Alternatively, the base station itself may detect the indication of interference. In a step or module 1430, the base station determines if it should coordinate its response with another base station (or other communication system control element). In a step or module

1440, if the base station determines that it should coordinate its response, it coordinates the location of a protected area of a subframe with a neighboring base station to relocate (or move) a portion of an uplink control channel for a user equipment. In a step or module 1450, if the base station has determined that it need not coordinate its response, the base station determines a protected area of a subframe to relocate a portion of a control channel for a user equipment. Following the step or module 1450, the base station signals the user equipment in higher-level signaling to relocate a portion of the control channel. The signaling can be in a higher layer to each user equipment separately, or alternatively, it can be in a system information block on a broadcast channel. The process ends at a step or module 1470.

Thus, as introduced herein, robustness of control channel information is protected against interference from another communication system such as a local area network (e.g., a Wi-Fi communication system), while allowing efficient operation thereof. Coordination of a coexistence mode with neighboring base station with minimal system overhead and a small amount of additional signaling to inform the user equipment of a variable location of control channels advantageously prevents harmful uplink-to-downlink or downlink-to-uplink interference between communication systems. Fast detection of transmission successes decreases latency and increases transmission efficiency.

An apparatus, method and system have been introduced herein to set a control channel configuration in a response to an indication of interference in a communication system. In one embodiment, an apparatus (e.g., embodied in a user equipment) includes a processor and memory including computer program code. The memory and the computer program code are configured to, with the processor, cause the apparatus to detect interference for the apparatus (e.g., by sensing a signal in a communication channel greater than a threshold level) operable on a communication system (e.g., a cellular communication system) from another communication system (e.g., a local area network), and provide an indication of the interference to a base station. The memory and the computer program code are further configured to, with the processor, cause the apparatus to receive an indication of a relocation of at least a portion of a control channel to a protected area in response to a signal from the base station in a system information block. The protected area may include a frequency and time communication resource located in a subframe or portion thereof assigned to a user equipment for an uplink transmission or downlink communication resource allocation that is less likely to be interfered by the another communication system. The memory and the computer program code are further configured to, with the processor, cause the apparatus to store a plurality of soft symbols from a subframe preceding the control channel to decode a current subframe. The portion of the control channel may include repeated control channel information, an uplink communication resource grant for the apparatus or a hybrid automatic retransmit request acknowledgement. Also, the control channel may include data masked with a known data sequence.

In another aspect, an apparatus (e.g., embodied in a base station) includes a processor and memory including computer program code. The memory and the computer program code are configured to, with the processor, cause the apparatus to ascertain an indication of interference to, for instance, a user equipment operable on a communication system (e.g., a cellular communication system) from another communication system (e.g., a local area network), and produce a signal in response to the indication of interference to relocate at least a portion of a control channel to a protected area. Again, the apparatus may ascertain the indication of interference by receiving the same from the user equipment or other communication element or may detect the indication of interference itself. The protected area may include a frequency and time communication resource located in a subframe or portion thereof assigned to a user equipment for an uplink transmission or downlink communication resource allocation that is less likely to be interfered by the another communication system. The memory and the computer program code are further configured to, with the processor, cause the apparatus to produce the signal in cooperation with a communication system control element and transmit the signal to the user equipment in a system information block. The portion of the control channel may include repeated control channel information, an uplink communication resource grant for the user equipment or a hybrid automatic retransmit request acknowledgement. Also, the control channel may include data masked with a known data sequence. Although the apparatus, method and system described herein have been described with respect to a cellular communication system operating in the neighborhood of an ad-hoc communication system, the apparatus and method are equally applicable to other types of communication systems.

Program or code segments making up the various embodiments of the present invention may be stored in a computer readable medium or transmitted by a computer data signal embodied in a carrier wave, or a signal modulated by a carrier, over a transmission medium. For instance, a computer program product including a program code stored in a computer readable medium may form various embodiments of the present invention. The "computer readable medium" may include any medium that can store or transfer information. Examples of the computer readable medium include an electronic circuit, a semiconductor memory device, a read only memory ("ROM"), a flash memory, an erasable ROM ("EROM"), a floppy diskette, a compact disk ("CD")-ROM, an optical disk, a hard disk, a fiber optic medium, a radio frequency ("RF") link, and the like. The computer data signal may include any signal that can propagate over a transmission medium such as electronic communication network communication channels, optical fibers, air, electromagnetic links, RF links, and the like. The code segments may be downloaded via computer networks such as the Internet, Intranet, and the like.

As described above, the exemplary embodiment provides both a method and corresponding apparatus consisting of various modules providing functionality for performing the steps of the method. The modules may be implemented as hardware (embodied in one or more chips including an integrated circuit such as an application specific integrated circuit), or may be implemented as software or firmware for execution by a computer processor. In particular, in the case of firmware or software, the exemplary embodiment can be provided as a computer program product including a computer readable storage structure embodying computer program code (i.e., software or firmware) thereon for execution by the computer processor.

Although the present invention and its advantages have been described in detail, it should be understood that various changes, substitutions and alterations can be made herein without departing from the spirit and scope of the invention as defined by the appended claims. For example, many of the features and functions discussed above can be implemented in software, hardware, or firmware, or a combination thereof. Also, many of the features, functions and steps of operating the same may be reordered, omitted, added, etc., and still fall within the broad scope of the present invention.

Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. An apparatus, comprising:
a processor; and
a memory including computer program code
said memory and said computer program code are configured to, with said processor, cause said apparatus to perform at least the following:
detect interference for said apparatus operable on a cellular communication system from a wireless local area network;
provide an indication of said interference to a base station; and
receive a signal from the base station informing a user equipment that at least a portion of a control channel has been relocated or repeated within a subframe, wherein the at least a portion of the control channel is relocated or repeated from a beginning of the subframe to a protected area,
wherein said protected area comprises at least one orthogonal frequency-division multiplex symbol towards an end of the subframe, wherein the wireless local area network has likely stopped transmission in the protected area.

2. The apparatus as recited in claim 1, wherein said memory and said computer program code are further configured to, with said processor, cause said apparatus to detect said interference by sensing a signal in a communication channel greater than a threshold level.

3. The apparatus as recited in claim 1, wherein said memory and said computer program code are further configured to, with said processor, cause said apparatus to receive said signal from said base station in a system information block.

4. The apparatus as recited in claim 1 wherein said portion of said control channel comprises at least one of: repeated control channel information, and an uplink communication resource grant for said apparatus or a hybrid automatic retransmit request acknowledgement.

5. The apparatus as recited in claim 1, wherein said control channel comprises data masked with a known data sequence.

6. The apparatus as recited in claim 1, wherein a data channel is formed between an original portion of the control channel and the repeated portion of the control channel.

7. The apparatus as recited in claim 1, wherein the user equipment is instructed to store at least one soft symbol in the subframe prior to decoding.

8. A computer program product comprising a program code stored in a non-transitory computer readable medium configured to:

detect interference for an apparatus operable on a cellular communication system from a wireless local area network;
provide an indication of said interference to a base station; and
receive a signal from the base station informing a user equipment that at least a portion of a control channel has been relocated or repeated within a subframe, wherein the at least a portion of the control channel is relocated or repeated from a beginning of the subframe to a protected area,
wherein said protected area comprises at least one orthogonal frequency-division multiplex symbol towards an end of the subframe, wherein the wireless local area network has likely stopped transmission in the protected area.

9. A method, comprising:
detecting interference for a user equipment operable on a cellular communication system from a wireless local area network;
providing an indication of said interference to a base station; and
receive a signal from the base station informing a user equipment that at least a portion of a control channel has been relocated or repeated within a subframe, wherein the at least a portion of the control channel is relocated or repeated from a beginning of the subframe to a protected area,
wherein said protected area comprises at least one orthogonal frequency-division multiplex symbol towards an end of the subframe, wherein the wireless local area network has likely stopped transmission in the protected area.

10. The method as recited in claim 9, wherein said detecting of said interference comprises sensing a signal in a communication channel greater than a threshold level.

11. The method as recited in claim 9, wherein a data channel is formed between an original portion of the control channel and the repeated portion of the control channel.

12. The method as recited in claim 9, wherein the user equipment is instructed to store at least one soft symbol in the subframe prior to decoding.

13. An apparatus, comprising:
a processor; and
a memory including computer program code
said memory and said computer program code are configured to, with said processor, cause said apparatus to perform at least the following:
ascertain an indication of interference on a cellular communication system from a wireless local area network;
relocate or repeat at least a portion of a control channel within a subframe, wherein the at least a portion of the control channel is relocated or repeated from a beginning of the subframe to a protected area in response to the indication of interference; and
produce a signal informing a user equipment of the relocating or the repeating of at least the portion of the control channel,
wherein said protected area comprises at least one orthogonal frequency-division multiplex symbol towards an end of the subframe, wherein the wireless local area network has likely stopped transmission in the protected area.

14. The apparatus as recited in claim 13, wherein said memory and said computer program code are further configured to, with said processor, cause said apparatus to produce said signal in cooperation with a communication system control element.

15. The apparatus as recited in claim 13, wherein said portion of said control channel comprises at least one of: repeated control channel information, and an uplink communication resource grant for user equipment or a hybrid automatic retransmit request acknowledgement.

16. The apparatus as recited in claim 13, wherein said control channel comprises data masked with a known data sequence.

17. The apparatus as recited in claim 13, wherein a data channel is formed between an original portion of the control channel and the repeated portion of the control channel.

18. A computer program product comprising a program code stored in a non-transitory computer readable medium configured to:
    ascertain an indication of interference on a cellular communication system from a wireless local area network;
    relocate or repeat at least a portion of a control channel within a subframe, wherein the at least a portion of the control channel is relocated or repeated from a beginning of the subframe to a protected area in response to the indication of interference; and
    produce a signal informing a user equipment of the relocating or the repeating of at least the portion of the control channel,
    wherein said protected area comprises at least one orthogonal frequency-division multiplex symbol towards an end of the subframe, wherein the wireless local area network has likely stopped transmission in the protected area.

19. A method, comprising:
    ascertaining an indication of interference on a cellular communication system from a wireless local area network;
    relocating or repeating at least a portion of a control channel within a subframe, wherein the at least a portion of the control channel is relocated or repeated from a beginning of the subframe to a protected area in response to the indication of interference; and
    producing a signal informing a user equipment of the relocating or the repeating of at least the portion of the control channel,
    wherein said protected area comprises at least one orthogonal frequency-division multiplex symbol towards an end of the subframe, wherein the wireless local area network has likely stopped transmission in the protected area.

20. The method as recited in claim 19, further comprising:
    producing said signal in cooperation with a communication system control element.

* * * * *